(12) United States Patent
Ripley et al.

(10) Patent No.: US 11,371,638 B2
(45) Date of Patent: *Jun. 28, 2022

(54) CONDUIT COUPLING ADAPTER (71) Applicant: Ripley's, Inc., Erhard, MN (US)

(72) Inventors: David E. Ripley, Erhard, MN (US); Craig G. Ripley, Erhard, MN (US)

(73) Assignee: Ripleys, Inc., Erhard, MN (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/012,419

(22) Filed: Sep. 4, 2020

(65) Prior Publication Data

US 2020/0400259 A1 Dec. 24, 2020

Related U.S. Application Data (63) Continuation of application No. 15/448,662, filed on Mar. 3, 2017, now Pat. No. 10,767,801.

(51) Int. Cl.
| | |
|---|---|
| *F16L 41/14* | (2006.01) |
| *F16L 19/00* | (2006.01) |
| *F16L 41/08* | (2006.01) |
| *H02G 3/06* | (2006.01) |

(52) U.S. Cl.
CPC ............. *F16L 41/14* (2013.01); *F16L 19/005* (2013.01); *F16L 41/082* (2013.01); *H02G 3/0616* (2013.01); *H02G 3/0675* (2013.01)

(58) Field of Classification Search
CPC ....... F16L 41/14; F16L 41/082; F16L 19/005; H02G 3/0691

USPC ..... 285/139.1, 139.2, 151.1, 154.1; 174/650, 174/652

See application file for complete search history.

(56) References Cited

U.S. PATENT DOCUMENTS

| | | |
|---|---|---|
| 3,749,424 A | 7/1973 | Greene |
| 4,022,966 A | 5/1977 | Gajajiva |
| 5,051,541 A | 9/1991 | Bawa |
| 5,129,684 A | 7/1992 | Lawrence |
| 5,190,408 A | 3/1993 | Ozeki |
| 5,261,761 A | 11/1993 | Knappert |
| 5,430,252 A | 7/1995 | Petersen |
| 5,899,234 A | 5/1999 | Senninger |
| 5,912,431 A | 6/1999 | Sheehan |
| 5,971,444 A | 10/1999 | Hawkins |
| 7,078,623 B1 | 7/2006 | Sheehan |
| 7,635,816 B1 | 12/2009 | Shemtov |
| 8,274,000 B2 | 9/2012 | Smith |
| 9,385,520 B1 | 7/2016 | Gretz |
| 2008/0246276 A1* | 10/2008 | Bravo ................ F16L 5/10 |
| 2009/0108581 A1 | 4/2009 | McCarthy |
| 2009/0242270 A1 | 10/2009 | Rumsey |
| 2011/0031740 A1 | 2/2011 | Stone |
| 2014/0197164 A1 | 7/2014 | Mavroeidis |
| 2016/0131294 A1 | 5/2016 | Lind |
| 2017/0152971 A1 | 6/2017 | PerMar |

* cited by examiner

*Primary Examiner* — Zachary T Dragicevich (74) *Attorney, Agent, or Firm* — Neustel Law Offices (57) ABSTRACT

A conduit coupling adapter for securing attaching a conduit to an enclosure is disclosed. The conduit coupling adapter generally includes a first end for receiving a conduit and attaching to it via an adhesive, and a second end coupled to the second end comprises threads and is configured for attaching to an enclosure using a locknut.

20 Claims, 11 Drawing Sheets

CONDUIT COUPLING ADAPTER

CROSS REFERENCE TO RELATED APPLICATIONS

The present application is a continuation of U.S. application Ser. No. 15/448,662 filed on Mar. 3, 2017 now issued as U.S. Pat. No. 10,767,801. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

The present invention relates generally to parts and methods for securely coupling conduits to wiring enclosures, such as handholes and junction boxes.

Related Art

Any discussion of the related art throughout the specification should in no way be considered as an admission that such related art is widely known or forms part of common general knowledge in the field. Current practices do not secure wiring conduits to junction boxes in the manner disclosed herein.

When attaching wiring conduits to junction boxes such as handholes, it has been a common practice to insert the conduits into the handhole with enough excess conduit that it would be unlikely for the conduit to be unintentionally extracted from the handhole by conditions such as rain, snow, ground shifting or other environmental conditions. Even though complete extraction of a conduit may be preventable in this manner, this technique will not prevent the conduit from shifting within a handhole because the conduit is not securely attached. For example, the conduit may shift while cables are being pulled through the conduit or during other installation tasks. Moreover, the excess conduit within the junction box restricts the ability to route cables and to accommodate additional conduits or cables. The result is that a larger junction box or additional junction boxes may need to be utilized to accommodate this extra conduit.

SUMMARY

The present invention generally comprises a conduit coupling adapter configured for attachment to a conduit and an enclosure in a secure manner that minimizes waste.

Thus, some of the embodiments of the conduit coupling adapter have been outlined rather broadly in order that the detailed description thereof may be better understood, and for the purpose that the present contribution to the art may be better appreciated. There are additional embodiments of a conduit coupling adapter that will be described hereinafter and that will form the subject matter of the claims appended hereto. In this respect, before explaining at least one embodiment of the conduit coupling adapter in detail, it is to be understood that the conduit coupling adapter is not limited in its application to the details of construction or to the arrangements of the components set forth in the following description or illustrated in the drawings. The conduit coupling adapter is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

An example conduit coupling adapter for coupling a conduit to an enclosure comprises a first end configured to receive a conduit and attached to the conduit using an adhesive and a second end configured for deposition within the opening of an enclosure wherein the second end comprises threads capable of receiving a locking nut and one or more washers.

Figure 1:
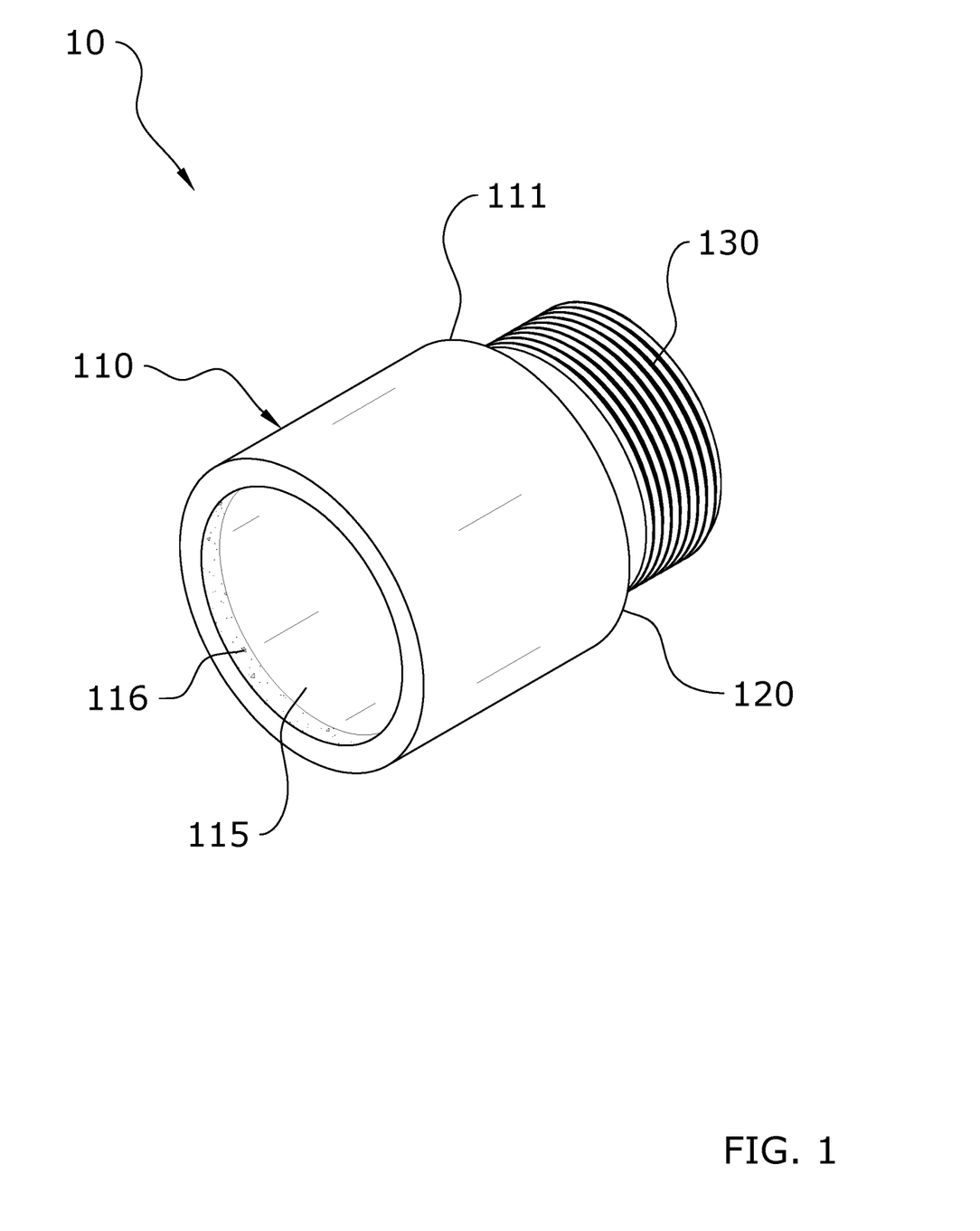
FIG. 1 is a perspective view of a conduit coupling adapter in accordance with an example embodiment.

FIG. 1 illustrates a conduit coupling adapter 10 suitable for coupling a conduit to an enclosure, such as a handhole. Conduit coupling adapter 10 comprises a first end 110 and a second end 120. First end 110 comprises an opening 115 that is adapted for receipt and attachment of a conduit using an adhesive. Opening 115 may also contain a bonding surface 116 that is especially adapted for attachment of the conduit coupling adapter 10 to a conduit using an adhesive. For example, bonding surface 116 may include one or more bumps or ridges designed to create a better adhesive bond between conduit coupling adapter 10 and a conduit. In other embodiments, bonding surface 116 comprises a material other than that of the coupling adapter 10 or first end 110. In other embodiments, bonding surface 116 is simply the rough interior surface of opening 115.

The second end 120 of conduit coupling adapter 10 is adapted for insertion within an opening in an enclosure, such as a handhole. The embodiment of second end 120, shown in FIG. 1, comprises threads 130 and is disposed within a washer 140. First end 110 and second end 120 meet at transition 111, which represents the transition from the exterior surface of first end 110 to the exterior surface of second end 120. Transition 111 could be an abrupt change or could be a gradual transition from one surface to the other. FIG. 1 illustrates an abrupt transition 111 from the wider diameter of first end 110 to the narrower diameter of second end 120. In other embodiments, transition 111 could transition from a narrower diameter of first end 120 to a wider diameter of second end 120. For embodiments in which first end 110 has the same shape and diameter as second end 120, transition 111 could be optionally absent. Transition 111 only reflects an exterior transition, if any, and may not correspond to an interior transition from first end 110 to second end 120.

Figure 2:
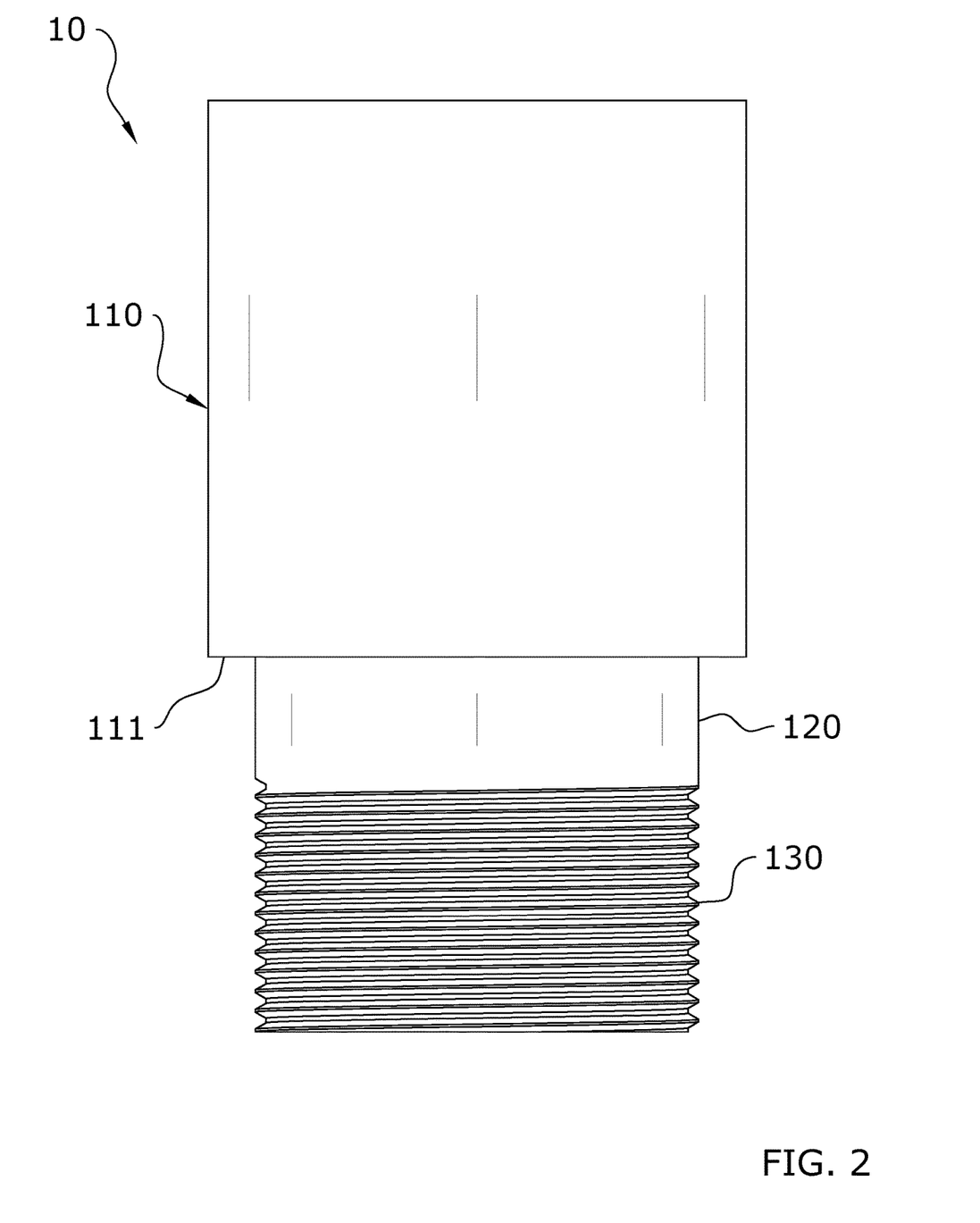
FIG. 2 is a top-down view of a conduit coupling adapter in accordance with an example embodiment.

FIG. 2 is a top-down view of the conduit coupling adapter 10 shown in FIG. 1. From this perspective, transition 111 is clearly shown having an abrupt transition from first end 110 to second end 120. Threads 130 are more clearly defined in this perspective. In some embodiments, threads 130 are created using a die to form threads in the outer surface of second end 120. In other embodiments, threads 130 are part of a separate component that is affixed to second end 120.

Figure 3:
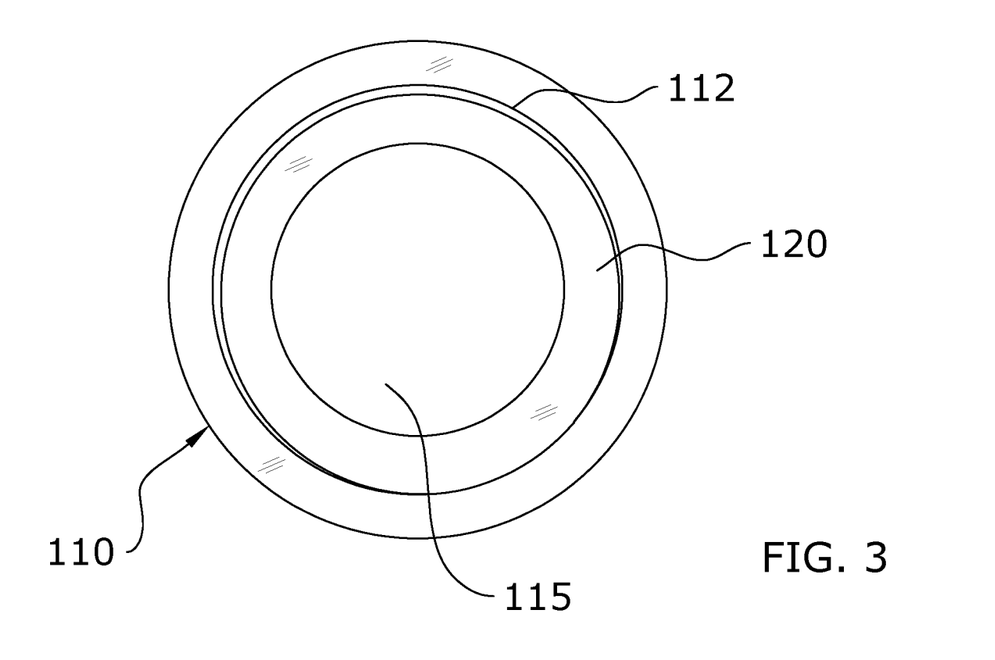
FIG. 3 is a cross-section of a conduit coupling adapter in accordance with an example embodiment.

FIG. 3 is a cross-section view of the conduit coupling adapter 10 shown in FIG. 1. From this perspective, second end 120 is shown with a narrower internal diameter than first end 110. The internal transition from first end 110 to second end 120 is transition 112. Much like transition 111, transition 112 could have a different configuration than the one shown in FIG. 3.

Figure 4:
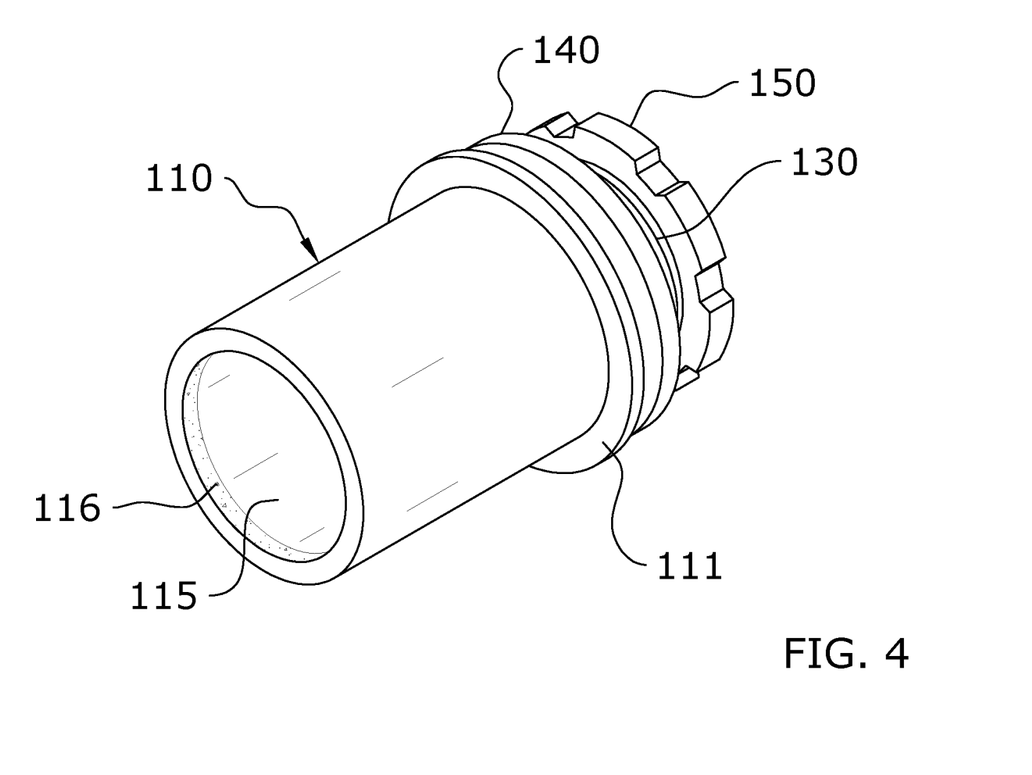
FIG. 4 is a perspective view of a conduit coupling adapter in accordance with an alternate example embodiment.

FIG. 4 is an alternate embodiment of a conduit coupling adapter 10. In FIG. 4, first end 110 and second end 120 have approximately the same diameter, and are separated by a transition 111 that is shaped like a flange. In this regard, transition 111 includes a wider diameter than that of both first end 110 and second end 120. FIG. 4 further illustrates a conduit adapter 10 with a washer 140 and locknut 150. In this embodiment, washer 140 is slipped over second end 120 and locknut 150 is rotated on to threads 130 of second end 120. Just as in FIG. 1, FIG. 4 illustrates an opening 115 and a bounding surface 116.

Figure 5A:
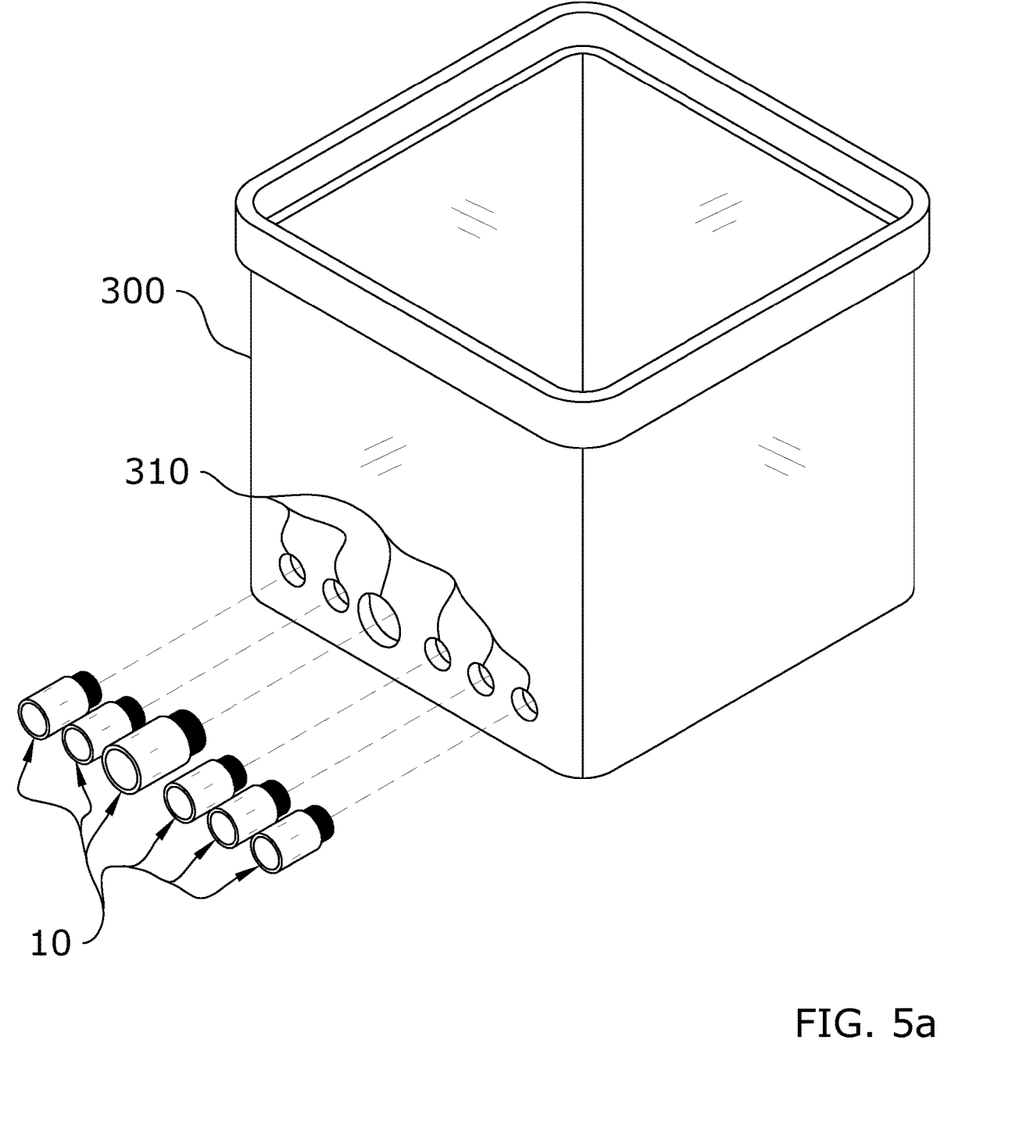
FIG. 5a is a perspective view of a handhole that is prepared to receive a plurality of conduit coupling adapters in accordance with an example embodiment.
Figure 5B:
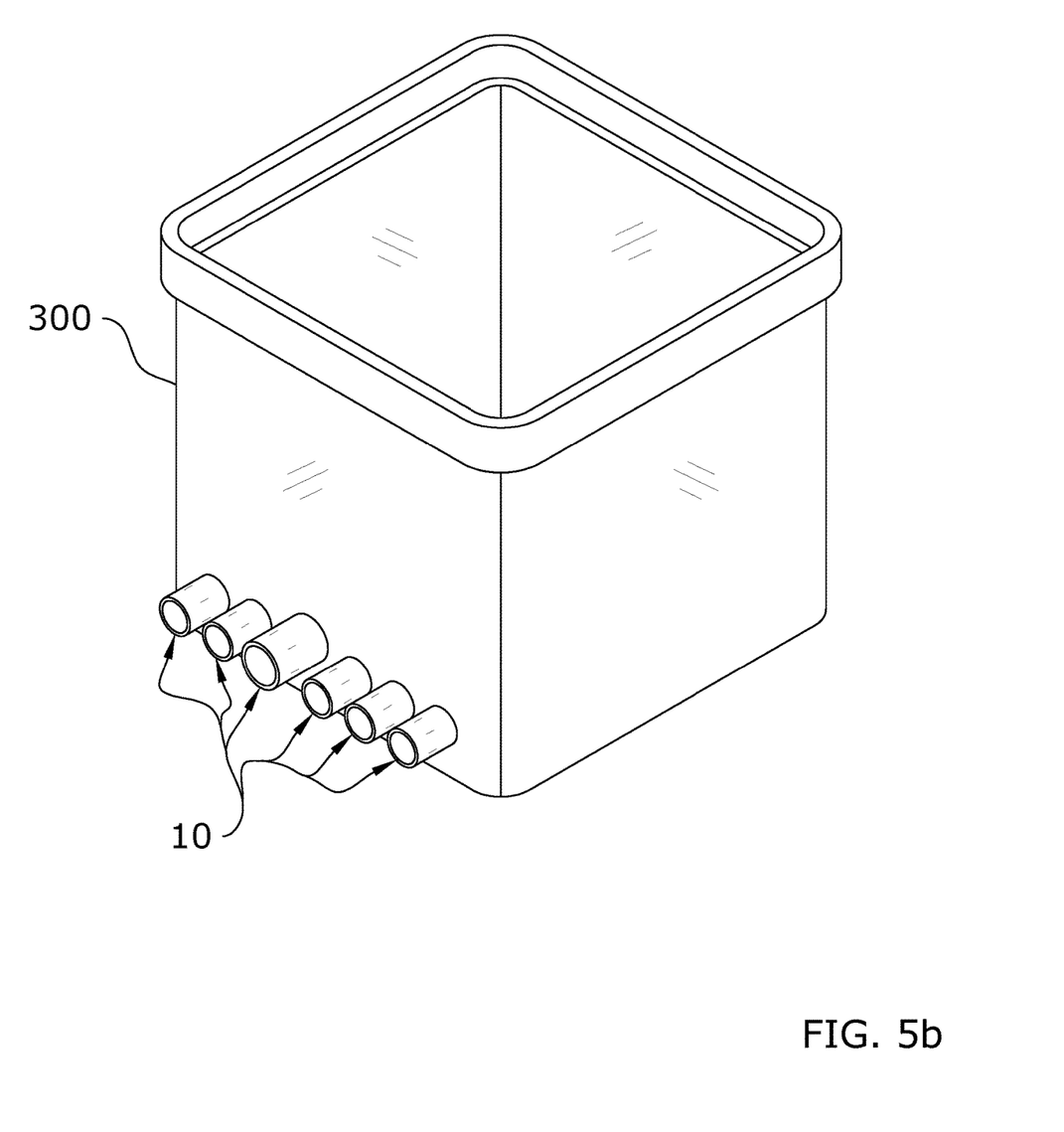
FIG. 5b is a perspective view of an example handhole that is coupled to a plurality of conduit coupling adapters in accordance with an example embodiment.
Figure 5C:
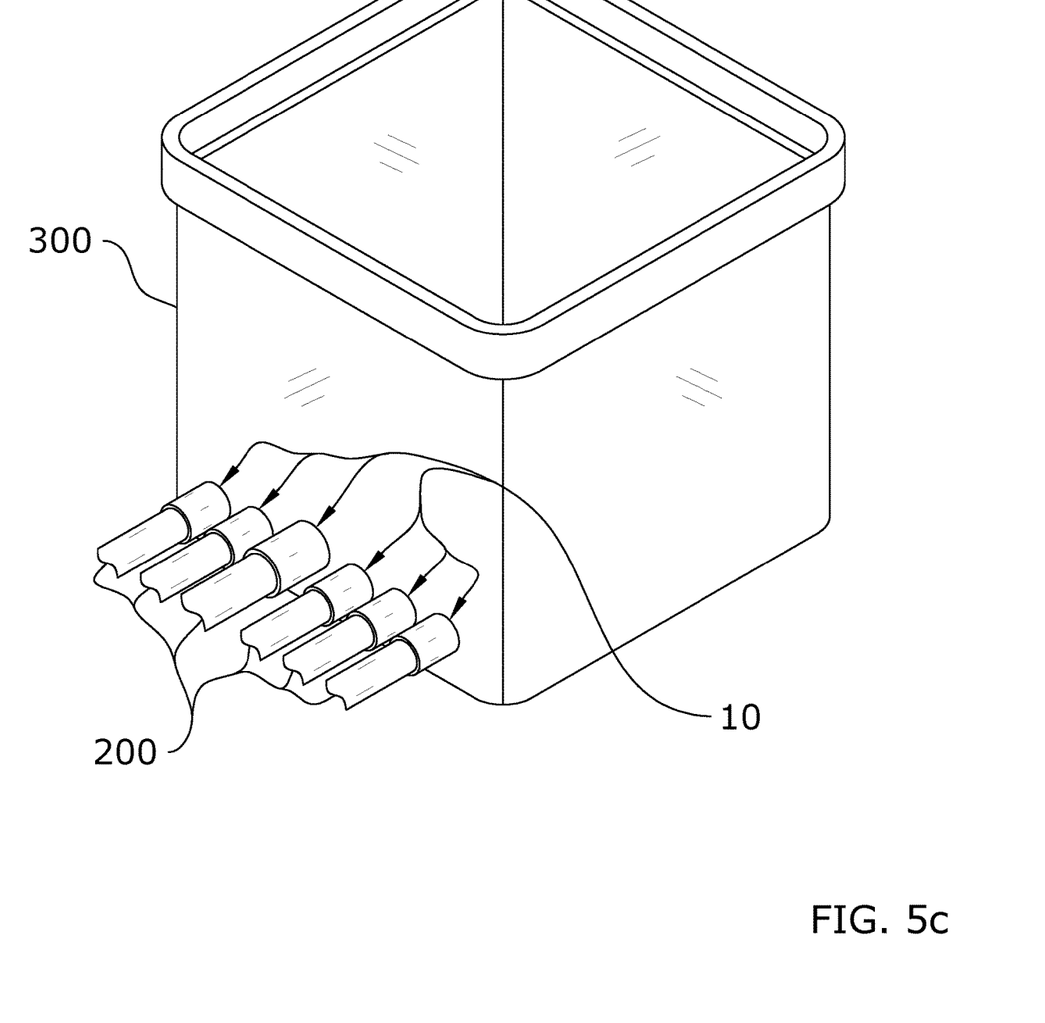
FIG. 5c is a perspective view of a handhole that is coupled to a plurality of conduits using a plurality of conduit coupling adapters in accordance with an example embodiment.

FIGS. 5a-c illustrates the installation of conduit coupling adapter 10 to a handhole 300. FIG. 5a shows a handhole 300 including a plurality of openings 310. Openings 310 can be created using a drill. Alternatively, if the enclosure includes predefined knockouts, one or more of these could be knocked out to create openings 310. Other methods of creating an opening in an enclosure such as handhole 300 include the use of a torch or a saw depending on the environment and the composition of handhole 300. As shown in FIG. 5a, openings 310 do not need to be of uniform size within an embodiment. In particular, the third opening 310 from the left is larger than the other five openings. Similarly, conduit coupling adapters 10 may have different sizes. For example, the third conduit coupling adapter 10 from the left is larger than the other conduit coupling adapters 10. Although FIG. 5a shows conduit coupling adapters 10 that have the same general shape, conduit coupling adapters 10 could differ in other ways, such as length or internal diameter, even for similarly-sized openings.

FIG. 5b illustrates the conduit coupling adapters 10 of FIG. 5a with their respective second ends 120 disposed within openings 310. FIG. 5b shows the threads 130 inserted within opening 310 such that their corresponding threads 130 are not visible from the exterior of handhole 300. FIG. 5c illustrates the conduit coupling adapters of FIG. 5b coupled to a plurality of conduits. In this embodiment, end portions of conduits 200 are disposed within the respective first ends 110 of conduit coupling adapters 10.

Figure 6:
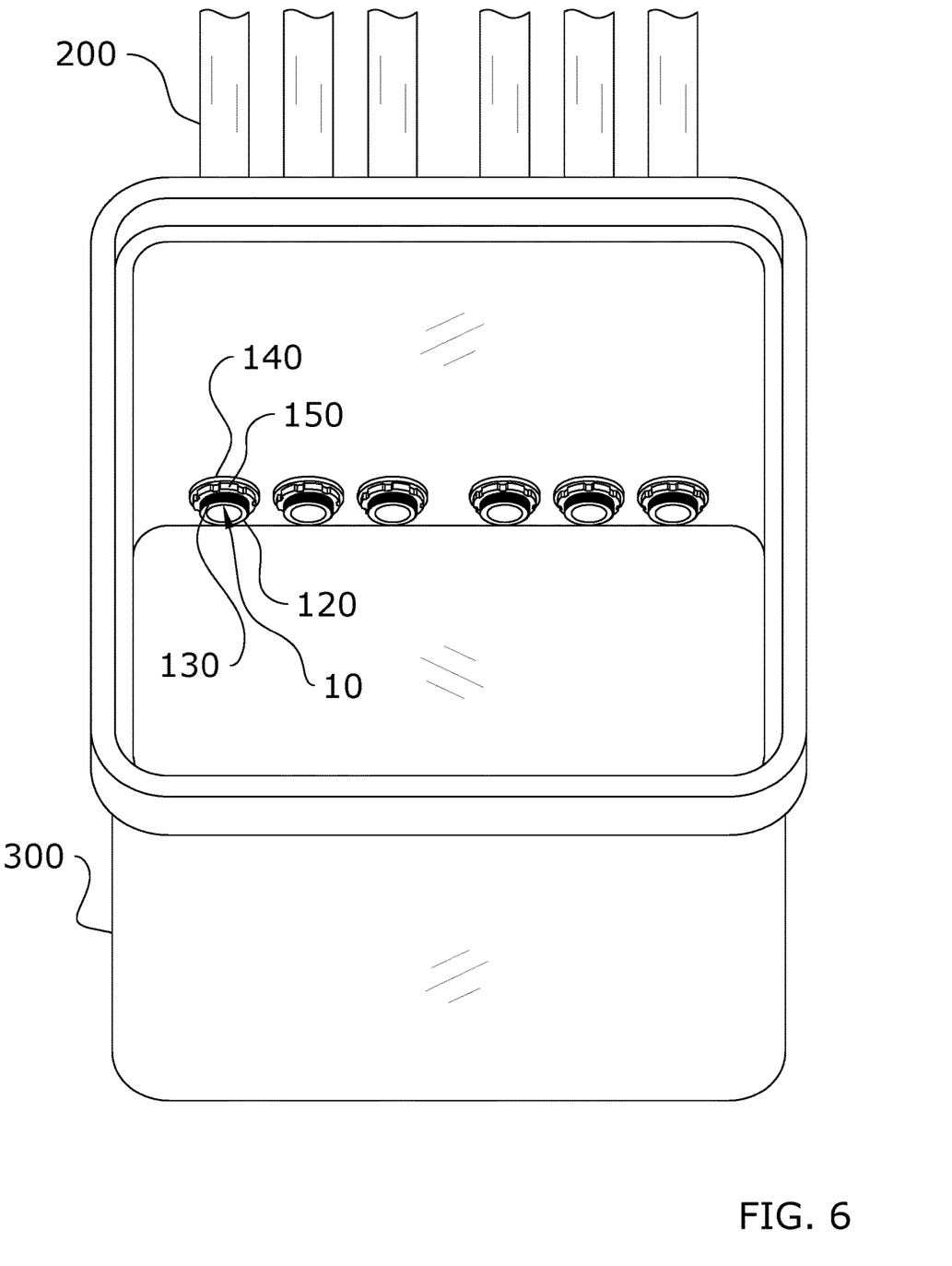
FIG. 6 is an interior perspective view of a handhole that is coupled to a plurality of conduits using a plurality of conduit coupling adapters in accordance with an example embodiment.

FIG. 6 is an alternate perspective view of FIG. 5b that shows the coupling of conduits 200 to enclosure 300 from within enclosure 300. This figure shows a plurality of conduits 120 coupled to handhole 300 using a plurality of conduit coupling adapters 10. The conduit coupling adapters 10 are attached to the enclosure 300 each using a washer 140 and a locknut 150. Washer 140 has been slipped over the end of second end 120, and locknut 150 has been securely rotated onto second end 120 using threads 130. In this embodiment locknut 150 has been sufficiently tightened to create a water-tight seal with opening 310. Moreover, in this embodiment, locknut 150 prevents conduit coupling adapter 10 from being removed from opening 310. Although this embodiment illustrates the creation of a water-tight seal, it is not necessary to create a seal in order to use the conduit coupling adapter disclosed herein.

Figure 7A:
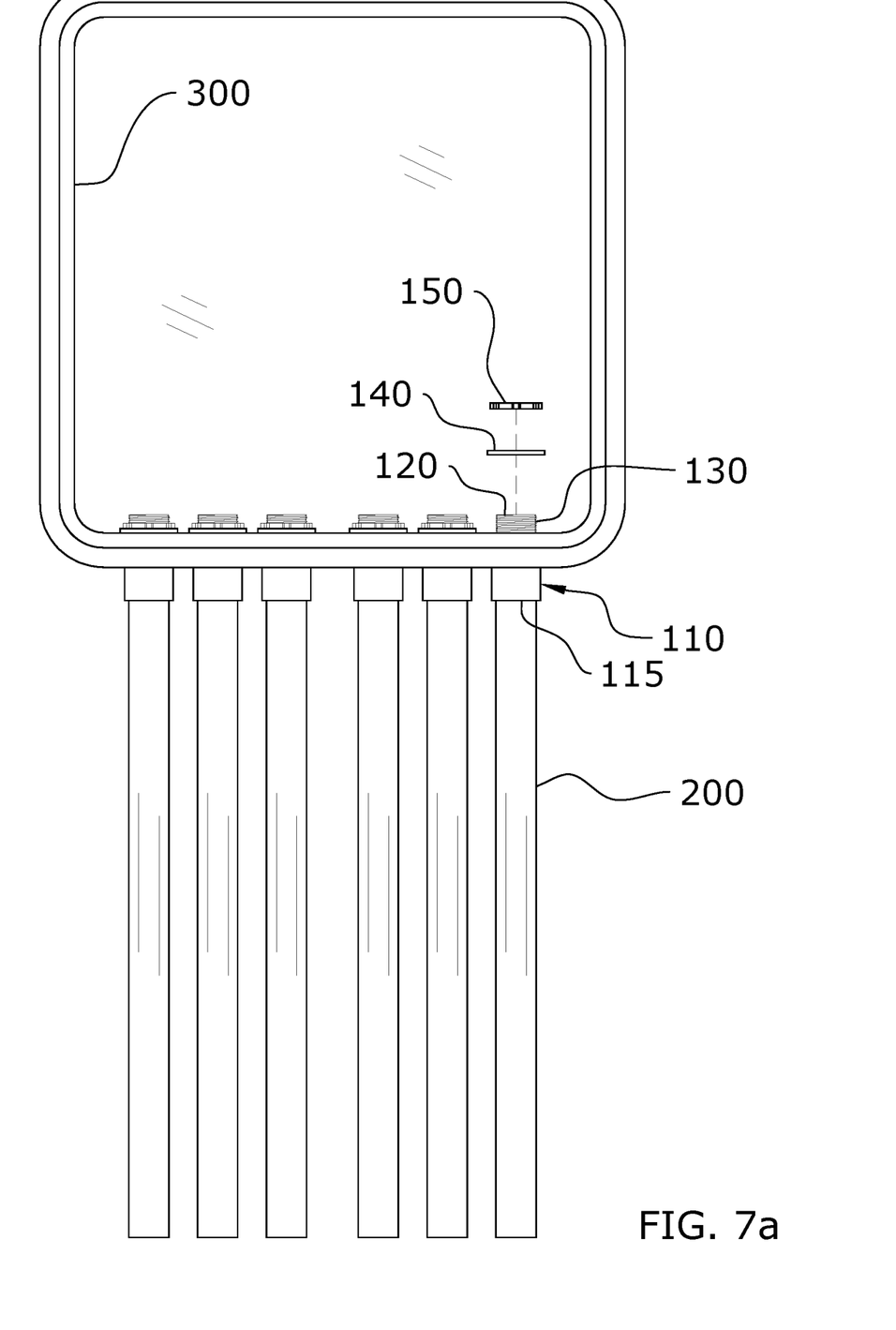
FIG. 7a is a top-down view of a handhole that is coupled to a plurality of conduits using a plurality of conduit coupling adapters in accordance with an example embodiment, including a partially secured conduit coupling adapter.
Figure 7B:
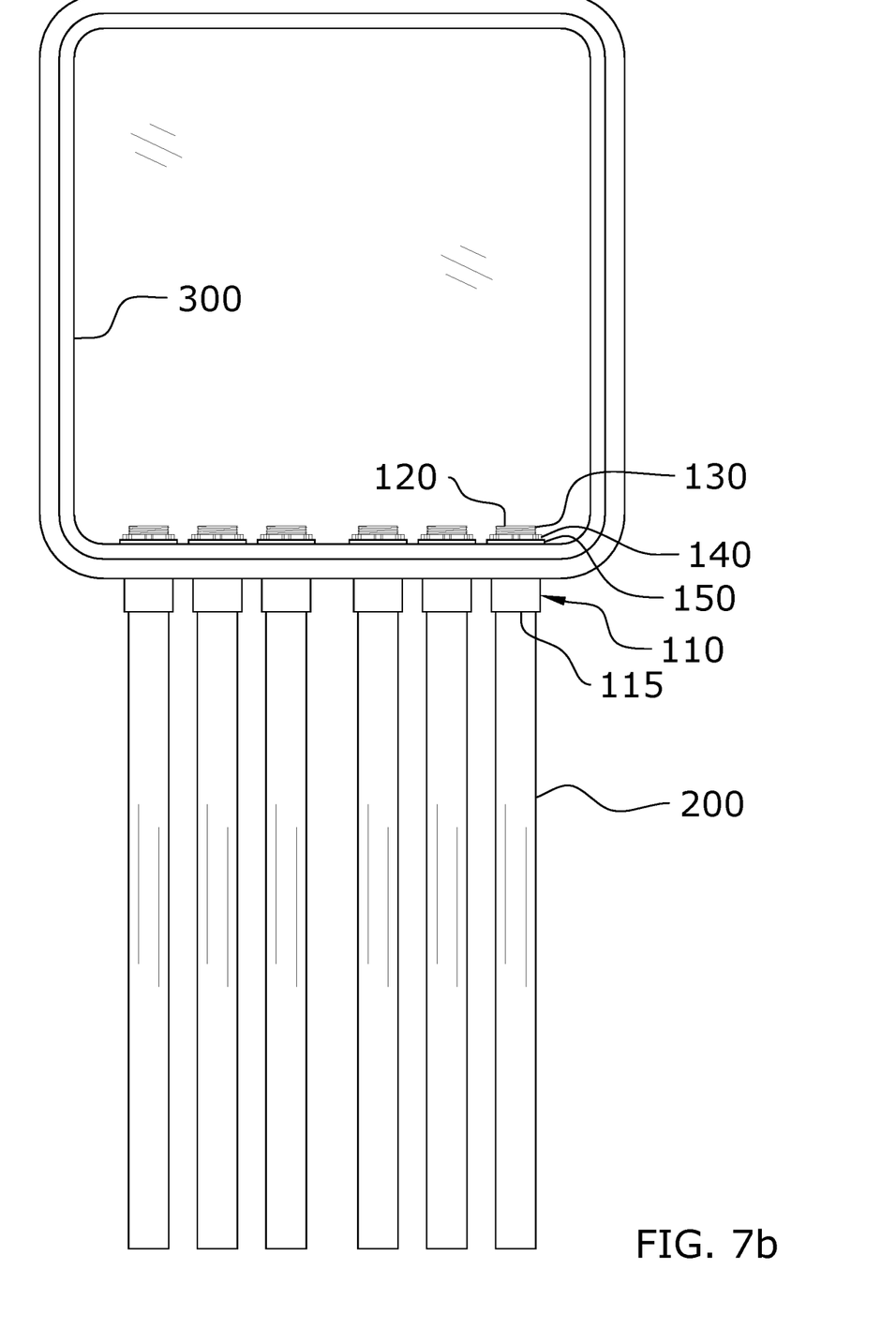
FIG. 7b is a top-down view of a handhole that is coupled to a plurality of conduits using a plurality of conduit coupling adapters in accordance with an example embodiment.

FIG. 7a is a top-down illustration of FIG. 6 with one example of washer 140 and locknut 150 detached from a conduit coupling adapter 10. A conduit coupling can be created by slipping washer 140 over the end of second end 120, and then securely attaching locknut 150 to second end 120 using threads 130. FIG. 7a shows conduits 200 inserted into respective openings 115 in first ends 110 of conduit coupling adapters 10. Conduits 200 can be secured to first ends 110 using an adhesive, for example. FIG. 7b is a further illustration showing washer 140 and locknut 150 securely attaching conduit coupling adapter 10 to enclosure 300 and thereby securely attaching conduit 200 to enclosure 300.

Figure 8:
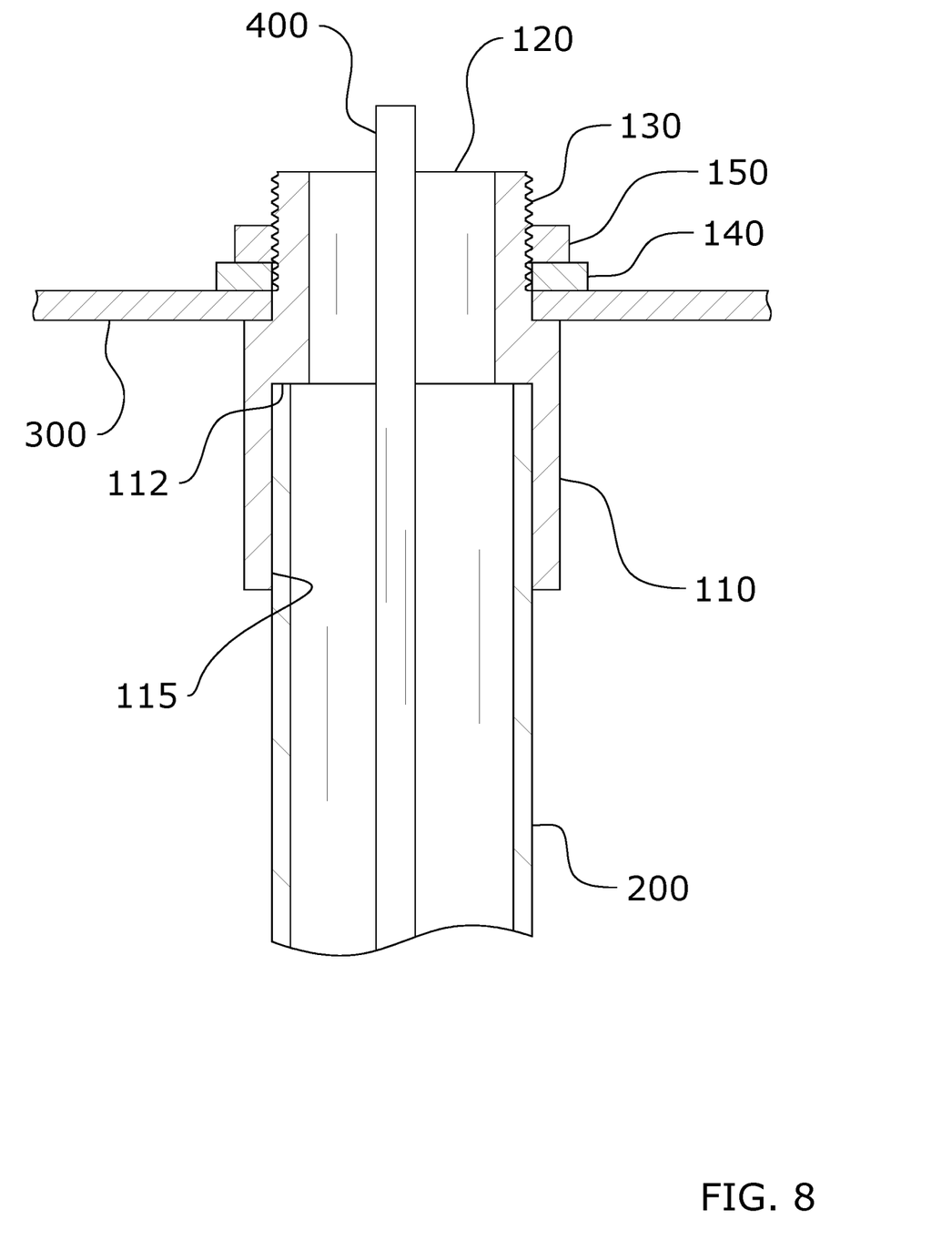
FIG. 8 is a top-down lateral cross-section of a conduit coupled to a handhole using a conduit coupling adapter.

FIG. 8 is a longitudinal cross-section of conduit 200 coupled to enclosure 300 using a conduit coupling adapter 10. In FIG. 8, an end portion of conduit 200 has been inserted into opening 115 such that it abuts the internal transition 112 between first end 110 and second end 120. FIG. 8 also includes a cable 400 disposed within conduit 200, conduit coupling adapter 10, and enclosure opening 310 such that cable 400 passes into enclosure 300 and can be used for any desired wiring tasks. In this embodiment, locknut 150 has been tightened along threads 130 such that washer 140 is pressed firmly against the interior of handhole 300 to create a seal between the exterior of handhole 300 and the interior of handhole 300. Although conduit 200 is shown with a larger internal diameter than second end 120, other embodiments utilize a first end with the same or larger internal diameter than second end 120. Moreover, in some embodiments transition 112 is a structure distinct from first end 110 and second end 120 such as a ring or flange.

Figure 9:
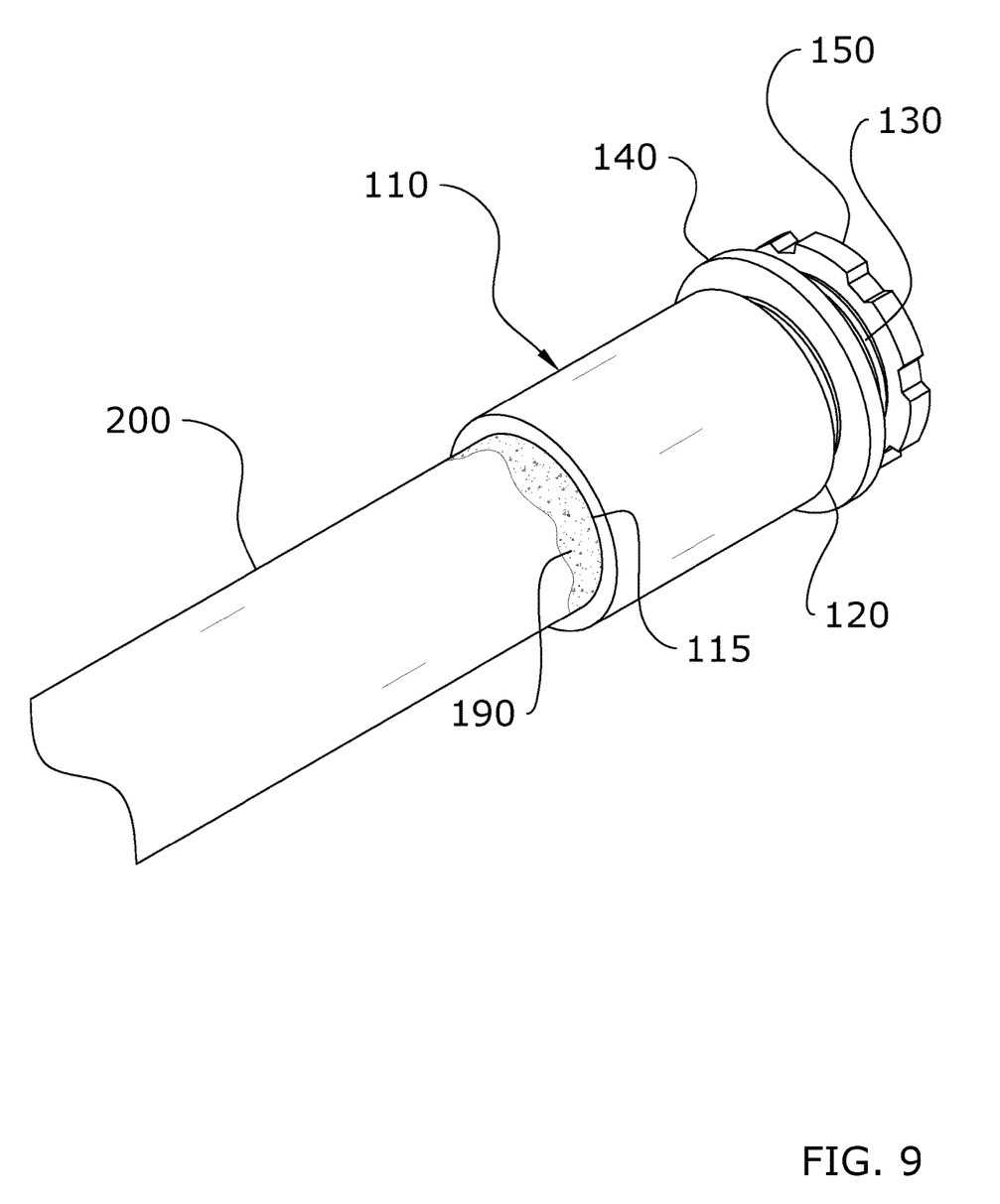
FIG. 9 is a perspective view of a conduit coupled to a conduit coupling adapter in accordance with an example embodiment.

FIG. 9 is a perspective view of a conduit 200 coupled to a conduit adapter 10 using an adhesive 190. In FIG. 9, an end portion of conduit 200 has been inserted into opening 115 with a sufficient amount to securely attach it to the conduit coupling adapter 10 using adhesive 190. The secure attachment shown in FIG. 9 does not require the end portion of conduit 200 to abut the internal transition 112 between first end 110 and second end 120 as shown in FIG. 8. FIG. 9 illustrates a washer 140 slipped over second end 120 and locknut 150 rotated on to threads 130.

In some embodiments, the disclosed conduit coupling adapter 10 is comprised entirely of polyvinyl chloride (PVC). In other embodiments, the enclosure 300 is a Polymer handhole, and the conduit 200 and conduit coupling adapter 10 are both comprised of schedule 80 PVC. In some embodiments washer 140 is a steel flat washer and locknut 150 is a steel locknut. Cable 400 could be any type of cable, including, but not limited to, coaxial cable, fiber optic cable, and twisted pair cable.

A conduit coupling adapter 10 of the type described herein can be manufactured by combining a PVC conduit coupler to a 3-inch length of schedule 80 PVC. In this embodiment, the PVC conduit coupler portion would represent first end 110 and the schedule 80 PVC portion would represent second end 120. Ends 110 and 120 can be coupled to each other using adhesives, clamps or other forms of mechanical attachment, such as screws or bolts. Threads 130 can be added to the exterior of second end 120 using an appropriately sized die. Locknut 150 is selected to such that is opening matches threads 130 on second end 120. Washer 140 is selected such that it can slip over second end 120 and threads 130. However, washer 140 is not limited to an opening that closely corresponds to the shape of second end 120 or to a disc shape. For example, if second end 120 and enclosure opening 310 are not complementary in shape or size, washer 140 may be selected to create a seal despite this disparity, assuming a seal is desired. This could occur when opening 310 is created using a pre-defined knockout as opposed to an arbitrary size created using a drill. In this circumstance, second 120 could be substantially smaller than opening 310.

The conduit coupling adapter 10 described herein can be installed within an enclosure 300, such as a handhole using the following method. However, the following method is one of many ways that the described conduit coupling adapter could be employed by a person having ordinary skill in the art.

One step for coupling a conduit 200 to the described handhole includes the creation of an enclosure opening 310 within the handhole 300. Such an opening can be created by using a drill with a desired diameter. Alternatively, if the enclosure includes predefined knockouts, one or more of these can be knocked out to create an opening. Other methods of creating an opening in an enclosure may include the use of a torch or a saw.

A conduit 200 can be attached to the conduit coupling adapter 10 by applying an adhesive to an end portion of conduit 200 before inserting this end portion into opening 115 in the first end 110 of conduit coupling adapter 10. An adhesive could also be applied to opening 115 before insertion of the end portion of conduit 120 therein. Optionally, additional adhesive can be added to the exposed portion of conduit 200 nearest the outer edge of the first end 110 of the conduit coupling adapter 10.

In some embodiments, once the conduit coupling adapter 10 has been attached to the conduit 200, at least a portion of second end 120 is inserted into an enclosure opening 310 in a handhole 300. Once this has occurred, a steel washer 140 is placed around second end 120, followed by a steel locknut 150. The steel locknut 150 is tightened until a proper seal is created between the conduit coupling adapter 10 and enclosure 300. In some embodiments, washer 140 is integrated into locknut 150 to create a single component.

In some embodiments, conduit coupling adapter 10 is coupled to conduit 200 before being coupled to enclosure 300. In other embodiments, conduit coupling adapter 10 is coupled to enclosure 300 before being coupled to conduit 200. In still other embodiments, conduit coupling adapter 10 is partially coupled to either the conduit or enclosure before being securely coupled. For example, conduit coupling adapter 10 can be slipped on to the end of conduit 200 and held in place via compression. Conduit coupling adapter 10 could then be inserted into opening 310 of the enclosure and securely tightened using washer 140 and locknut 150. This could be followed by the application of adhesive to the exposed end portion of conduit 200 and the outer edge of the first end 110 of conduit coupling adapter 10. Optionally, conduit could be separated from first end 110, and then adhesive could added within opening 115 of first end 110 before reinserting the end portion of conduit 200.

Unless otherwise defined, all technical and scientific terms used herein have the same meaning as commonly understood by one of ordinary skill in the art to which this invention belongs. Although methods and materials similar to or equivalent to those described herein can be used in the practice or testing of the conduit coupling adapter, suitable methods and materials are described above. All publications, patent applications, patents, and other references mentioned herein are incorporated by reference in their entirety to the extent allowed by applicable law and regulations. The conduit coupling adapter may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A conduit coupling system, comprising:
    an enclosure including an enclosure opening, wherein the enclosure opening leads from an exterior of the enclosure to an interior of the enclosure;
    a conduit coupling adapter comprising a first portion including a first opening and a second portion including a second opening, wherein the first opening is at a first end of the conduit coupling adapter and wherein the second opening is at a second end of the conduit coupling adapter;
    a flange defined between the first portion and the second portion of the conduit coupling adapter, wherein the second end of the conduit coupling adapter is disposed within the enclosure opening of the enclosure such that the flange of the conduit coupling adapter rests against the exterior of the enclosure; and
    a conduit including an end portion, wherein the end portion of the conduit is terminated and secured within the first opening of the first end of the conduit coupling adapter by an adhesive, wherein the first opening of the first end of the conduit coupling adapter comprises a bonding surface adapted for bonding the conduit to the first opening of the first end of the conduit coupling adapter using the adhesive.

2. The conduit coupling system of claim 1, wherein the first portion of the conduit coupling adapter is wider than the second portion of the conduit coupling adapter.

3. The conduit coupling system of claim 1, wherein the second end of the conduit coupling adapter comprises a threaded portion.

4. The conduit coupling system of claim 3, further comprising a locknut removably connected to the threaded portion of the second end of the conduit coupling adapter such that the conduit coupling adapter is connected to the enclosure, wherein the locknut is positioned within the interior of the enclosure.

5. The conduit coupling system of claim 4, further comprising a washer positioned about the second end of the conduit coupling adapter.

6. The conduit coupling system of claim 5, wherein the washer is positioned between the enclosure opening of the enclosure and the locknut in a manner that creates a watertight seal between each side of the enclosure opening of the enclosure.

7. The conduit coupling system of claim 1, wherein the conduit comprises a circular cross-section.

8. The conduit coupling system of claim 1, wherein the conduit coupling adapter comprises a circular cross-section.

9. The conduit coupling system of claim 1, wherein the enclosure is comprised of a handhole.

10. The conduit coupling system of claim 1, further comprising a cable extending from the exterior of the enclosure into the interior of the enclosure, wherein the cable extends through the conduit and the conduit coupling adapter.

11. The conduit coupling system of claim 10, wherein the cable is comprised of an electrical cable.

12. The conduit coupling system of claim 1, wherein the bonding surface comprises one or more ridges for improving an adhesive bond between the conduit coupling adapter and the coupler.

13. The conduit coupling system of claim 1, wherein the bonding surface comprises one or more bumps for improving an adhesive bond between the conduit coupling adapter and the coupler.

14. The conduit coupling system of claim 1, wherein the first portion of the conduit coupling adapter is longer than the second portion of the conduit coupling adapter.

15. A conduit coupling system, comprising:
an enclosure including an enclosure opening, wherein the enclosure opening leads from an exterior of the enclosure to an interior of the enclosure;
a conduit coupling adapter comprising a first portion including a first opening and a second portion including a second opening, wherein the first opening is at a first end of the conduit coupling adapter and wherein the second opening is at a second end of the conduit coupling adapter;
a flange defined between the first portion and the second portion of the conduit coupling adapter, wherein the second end of the conduit coupling adapter is disposed within the enclosure opening of the enclosure such that the flange of the conduit coupling adapter rests against the exterior of the enclosure;
a conduit including an end portion, wherein the end portion of the conduit is terminated and secured within the first opening of the first end of the conduit coupling adapter by an adhesive, wherein the first opening of the first end of the conduit coupling adapter comprises a bonding surface adapted for bonding the conduit to the first opening of the first end of the conduit coupling adapter using the adhesive;
a locknut removably connected to the second end of the conduit coupling adapter such that the conduit coupling adapter is connected to the enclosure, wherein the locknut is positioned within the interior of the enclosure; and
a cable extending between the exterior of the enclosure and the interior of the enclosure, wherein the cable extends through the conduit and the conduit coupling adapter.

16. The conduit coupling system of claim 15, wherein the cable is selected from the group consisting of a coaxial cable, a fiber optic cable, and a twisted pair cable.

17. The conduit coupling system of claim 15, wherein the second end of the conduit coupling adapter comprises a threaded portion and wherein the locknut is removably connected to the threaded portion of the conduit coupling adapter.

18. The conduit coupling system of claim 15, wherein the enclosure comprises a junction box.

19. The conduit coupling system of claim 15, further comprising a washer positioned about the second end of the conduit coupling adapter.

20. The conduit coupling system of claim 15, wherein the conduit and the conduit coupling adapter each comprise a circular cross-section.

* * * * *